Sept. 3, 1935.   F. FARRELL   2,013,437
CLAMP
Filed Sept. 20, 1934
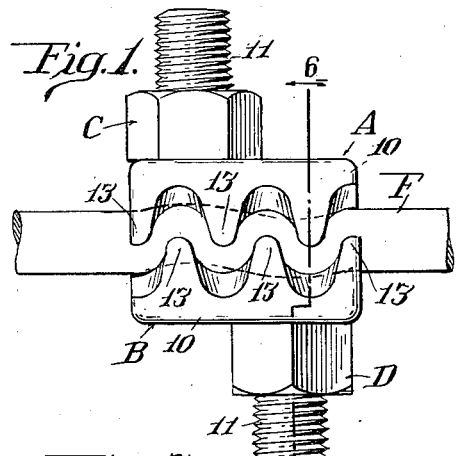
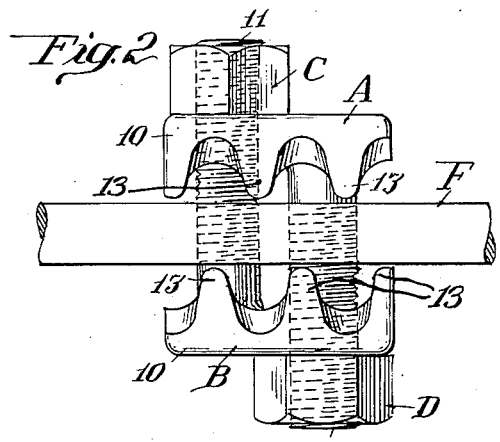
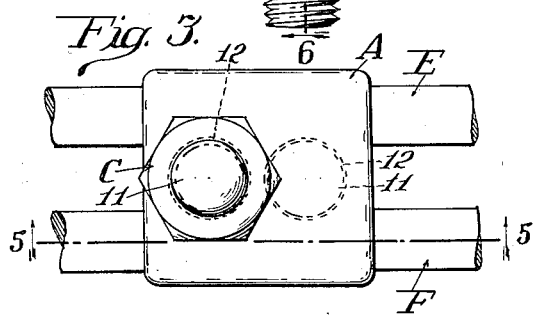
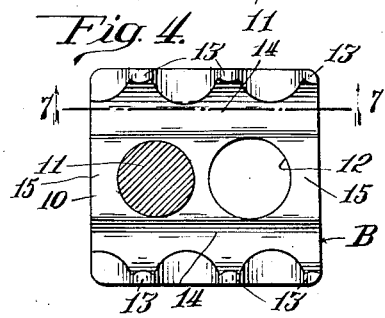
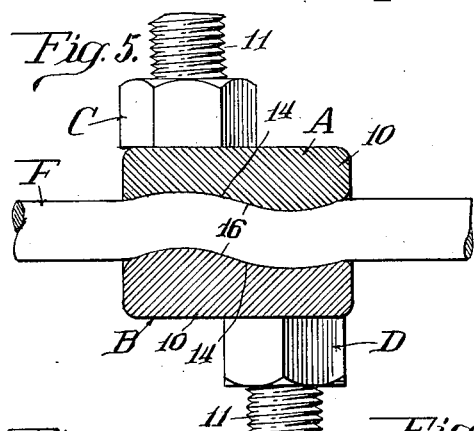
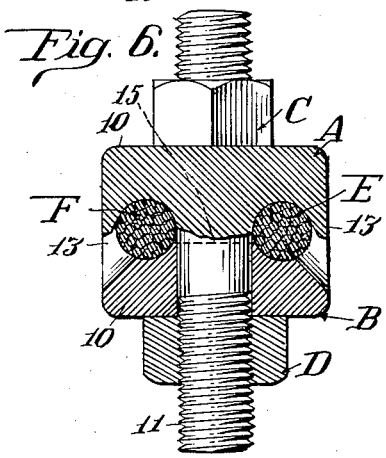
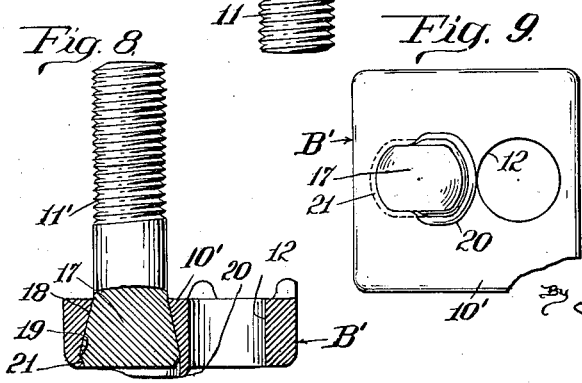
Inventor
Fred Farrell
By Thomas H. Ferguson
Attorney Patented Sept. 3, 1935

2,013,437

UNITED STATES PATENT OFFICE 2,013,437

CLAMP

Fred Farrell, Elmwood Park, Ill., assignor to Electrical Engineers Equipment Company, a corporation of Illinois Application September 20, 1934, Serial No. 744,781

3 Claims. (Cl. 24—135)

The present invention relates to clamps for holding wires or cables, such as guys and the like, and the structure contemplated is such that it may be used equally well upon either smooth wires or cables made up of stranded wires twisted together like the strands of a rope.

Such clamps usually consist of retaining members which press against opposite sides of the wire or cable under screw action applied by retaining nuts screwed down upon threaded studs or bolts suitably associated with the members.

One object of the present invention is to provide gripping surfaces upon the retaining members such that they will not bite into the wire or cable but will engage the same with a smooth surface and yet a surface such as to prevent slippage of the wire or the cable through the clamp. Preferably this result is obtained by providing a smooth wave-like interior for each cable channel such that when the cable portions are pressed home between the engaging members of the clamp each will assume a wave-like curve. Commonly a single reverse curve is sufficient to hold the cable, but it may be desirable in some instances to continue the wave on through further wave-like extensions.

Another object is to insure safety to the clamp and the connected cable portions by reducing the possibility of damage to the cable or cable strands. This is preferably accomplished by giving the cable channels smooth surfaces, even though the same be curved as above indicated. The cable is not abraded and its strands remain undamaged when engaging such smooth though curved surfaces.

Another object is to provide for the ready assembly of the clamp in service and to so construct the holding members which bear upon the cable that the latter cannot be shifted in the cable channels either while the cable portions are being positioned or after the retaining members are screwed down tight upon the cable. In the preferred embodiment this is accomplished by giving the edges of the holding members projecting teeth which assist in holding the cable against shifting in the curve. These toothed edges have been termed "alligator jaws" by users of the device.

Another object is to provide a clamp that may be used effectively with cables and wires of different diameters throughout a reasonable range without changing the size and shape of the clamp. This requires that the clamp parts must adjust themselves slightly in order to provide the proper reverse curve in the cable spaces. In all these cases, too, the cross-section of the cable space at all points must be of practically the same configuration and of but slightly different area. Having the openings in the clamping heads slightly larger in diameter than the bolts which pass through them contributes to the ready adjusting of the parts to the differently sized cables.

Another object is to provide a clamp which small be easy to install. This is preferably accomplished by so constructing the clamp parts that they may be assembled in a loose open position and while in this position applied to the cable portions and then screwed down tight to bring the parts into final position. Because of this construction the workman has only one article to handle when seeking to apply the clamp to cable ends or other cable portions. The construction by which this loose assembly is possible is of considerable practical advantage.

Another object is to provide a clamp of few parts, the preferred embodiment consisting of two identical drop forgings and two nuts. Threaded studs to which the nuts are applied are included as parts of the forgings.

Other objects are to produce a clamp which is strong, simple and relatively small and light.

In attaining these objects, the clamp is preferably constructed and arranged as shown in the accompanying drawing and described more fully in the following detailed description. The scope of the invention is set forth in the appended claim.

In said drawing, Fig. 1 is a side elevation of a clamp constructed in accordance with the present invention, shown applied to a plurality of cable portions; Fig. 2 is a similar view showing the parts in loosely assembled relation, which relation permits positioning the device upon the cables without fully removing the nuts from their studs; Fig. 3 is a plan view of the device with its parts screwed home upon the cable portions after the manner illustrated in Fig. 1; Fig. 4 is a plan view of one of the two identical forgings which form the principal parts of the clamp; Fig. 5 is a vertical section through the clamp along one of the channels showing the reverse curve relation of the channel bottoms and the cable itself when the parts of the clamp are firmly seated, the plane of section being indicated by the line 5—5 of Fig. 3; Fig. 6 is a transverse section through the device and associated cables, the plane of section being indicated by the line 6—6 of Fig. 1; Fig. 7 is a sectional view taken along one of the cable channels of one of the clamping members, the plane of section being indicated by the line 7—7 of Fig. 4; Fig. 8 is a partial central sectional view of a modified clamping member showing the stud and head as separately made but united into a single unitary clamping member; and Fig. 9 is a bottom plan view of the same. Throughout these views like characters refer to like parts.

As before indicated the clamp comprises an upper clamping member A, a lower clamping member B, a nut C associated with the member A, and a nut D associated with the member B. These parts cooperate in securing the cable portions E and F.

The members A and B are identical and each comprises a head 10 and a stud 11. The entire member is preferably a drop forging. Thus the stud 11 is an integral part of the head 10. As clearly shown, the head 10 is substantially rectangular in outline when viewed in plan and the stud 11 extends upward from a point near one end of the rectangle. Toward the other end of the rectangle the head is provided with an opening 12. The stud 11 and opening 12 are in longitudinal alinement and the opening is made large enough to loosely fit over the stud 11 of the associated clamping member.

By making up the clamping members A and B in this way, both may be made identical and this is a great convenience in the manufacture of the device. When it is necessary to provide a clamp, all that need be done is to take two of these identical members and bring them together so that the stud 11 of each passes through the hole 12 of the other. The studs 11 are suitably threaded and the nuts C and D may be readily applied to force the members A and B toward each other into firm holding engagement with the cable ends or portions E and F.

As clearly shown in Fig. 2, the studs 11 have sufficient length so that the nuts C and D may be turned off far enough to permit the members A and B to be separated sufficiently to allow the cables E and F to be slipped into place between the members A and B without actually removing the nuts from the studs. In this way, the unscrewing of the nuts C and D to points near the ends of the studs 11 provides a loose assembly which the workman may take in his hand and easily apply to the cable ends without the likelihood of dropping any parts of the clamp. When the cable ends are properly positioned, then the nuts need only be screwed down to force the clamping heads toward each other into firm engagement with the opposite sides of the cable portions E and F.

When this positioning of the parts is being brought about, the cables are at first engaged by teeth 13 along the outer edges of the heads 10 and just outward of the cable channels 14 which are substantially parallel and lie between the stud 11 and opening 12 on the one hand and the teeth 13 on the other hand, in the case of each of the members A and B. As clearly shown, the teeth 13 on the member A dovetail with the teeth 13 upon the member B so that if there were no cable ends E and F between the members A and B, the teeth on the one member would fit quite compactly between the teeth on the other member, and the central faces 15 of the members A and B would come into engagement with each other.

When it comes to the cable channels 14, it should be noted that these channels have smooth surfaces against which the surfaces of the cable portions E and F press and being smooth there is no danger of damaging the wires which go to make up the cable portions; or if simple wires of a single strand but of considerable diameter were employed instead of cables made up of strands of wire, then the surfaces of the wires would be left smooth and undamaged because of engaging smooth surfaces in the channels 14.

In order to firmly grip the cables E and F and to hold them against longitudinal movement by reason of strong tensions applied to them, the channels 14 are provided with wave-like bottoms 16 which, as clearly shown in Fig. 5, constitute within the limits of members A and B a reverse curve in which the curvature is preferably slight, that is to say, a curvature with a long radius rather than a short radius. As clearly shown in Fig. 5, beginning at the left the space left between the curved channel bottoms at first rises upward and then extends downward to a point near the right hand end of the members A and B and then rises again until the cable as it emerges at the right of the device is in substantial alinement with the cable portion entering at the left of the device. Preferably in practice where the length of the clamping heads 10 is about 1½ inches, the radius of curvature of the curved bottoms 16 is substantially equivalent to that of a 3 inch diameter sheave. The result of placing the two clamping heads together, due to the wavy bottoms of the channels, is to provide a sinuous space for the lodgement of the cable.

It will be seen that when the cable portions are slipped into place between the separated heads 10 of the clamping members, the cable portions will be substantially rectilinear but that as soon as the heads are forced together by screwing down the nuts upon the shanks then the cable portions will be distorted so as to conform in shape to the space provided between the curved bottoms of the opposing channels of the heads 10 of the associated members A and B. The full application of pressure by the nuts will finally firmly seat the heads 10 upon the cable portions and the latter will assume the reverse curve illustrated in the drawing.

In this connection it may be pointed out that the clamp will take in and securely hold cable sizes of different diameters without changing any of the parts. Thus, with a clamp length of about 1½ inches, cable diameters ranging from ⅛ to ⅜ inches may be readily and effectively secured. The curved bottoms 16 of the channels are so curved that slight longitudinal shiftings of the heads 10 of the members A and B relative to each other will take place as they are pressed home upon the cables and in that way the clamping members seat themselves upon the cables even though there be the differences in diameter noted. This adjustment is made possible by having the holes 12 slightly larger than the studs 11. In all these cases the cross sections of the cable spaces formed by the sets of opposing bottoms 16 and associated channel walls are of substantially the same configuration throughout although differing slightly in area. The opposing portions of the channel bottoms 16 are struck on substantially the same centers and with relatively long radii so that they register well even though the member be slightly shifted longitudinally relative to each other.

As before pointed out, the members A and B are identical. They are also unitary integral members, the heads 10 and studs 11 being composed of a single piece of metal. Instead of so forming these members, each may be formed after the manner of the member B' shown in Figs. 8 and 9. As there shown, the stud 11' is provided with a tapered head 17 and the clamping head 10' is provided with an aperture 18 for reception of the stud head. The bolt head 17 and the opening 18 into which it fits are similarly shaped with relatively flat sides so as to prevent the stud 11' from turning in the clamp head 10'. The edge of the bolt head is chamfered at 19 and the material of the clamping member 10' normally provides an upstanding flange 20 which extends completely around the opening 18. After the pin 11' is in final assembled position, as shown in Fig. 8, then the rib or flange 20 is forced down into a flattened position against the chamfered edge 19 to provide the holding flange 21. The shifting of the material to remove the flange 20 and form the flange 21 may be variously accomplished, as by hammering or pressing. Thus, the member B' is made up of parts and these parts are assembled and fixed together to make up the unitary member. This modified construction makes it clear that many other ways of building or forming the identical members of the clamp may be employed without departing from the spirit of the invention.

It may be pointed out that the reverse curve provided by the cable channels eliminates all possibility of slippage of the cable within the clamp when the parts are all properly tightened by screwing down the nuts. Again, the cable being held in its own smooth groove in each of the cable channels will be safe from abrasion or damage to any part of the cable. The "alligator jaws" as before noted prevent the cable from shifting in the groove. Preferably the clamp is made strong by forming it of dropped forged steel and it is rendered durable by a hot dip galvanizing all over. The feature of being enabled to assemble the cables in the grooves without removing the nuts is important. This construction enables the loosely assembled device to be handled as a single unit. As before indicated the cable is small, the length of the device not being over 1½ inches; at least such a size has been found very useful in service. With such a small clamp there is necessarily a small weight. With a clamp of about 1½ inches in length the weight will not be more than about 10 ounces and this weight is sufficiently small so that the device may "ride" with any vibration of the cable. The universal application of a clamp of the size and weight indicated is apparent from the fact that such a device will grip a cable for a minimum diameter of $\frac{3}{16}$ of an inch or a maximum diameter of ⅜ of an inch. These particular dimensions, of course, are merely typical and the invention would be just as applicable to clamps of different sizes, having heads of greater or less lengths. It will be noted also that the cable channels in the present construction lie on opposite sides of the studs 11 by which the clamp is forced into its final position. This arrangement tends to equalize the strains and to divide them equally where the cables are of the same size and in this way provide a maximum of efficiency with a minimum of weight and size. In speaking of the curvature into which the cable portion is forced, as shown for example in Fig. 5, it may be stated that in the preferred construction the curvature is a reverse curve after the general outline of the letter S. If the cable should tend to slip in the clamp, then the portion of the cable within the clamp, if slippage actually occurred, would be bent back and forth as that portion passed along the serpentine path provided by the reversely curved channel. The resistance of the material of the cable to such bending, greatly assists in improving the grip of the device on the cable. It should also be noted that in this arrangement the one cable is not crushed against the other cable. There are also no sharp edges or points which can bite into the material of the cable. By giving the cable channel this peculiar curve it is possible to maintain sufficient grip upon the cable without having a long heavy clamp. Thus, unnecessary weight is kept off of the guy wire or cable if the clamp be used upon such. The relation of the curved bottoms 16 to each other is also such that it is impossible to assemble the two members A and B in such a way as not to give the reverse curve contemplated. Where parts are assembled by workmen and held together by separate bolts, as in the prior art, the possibility of wrong assembly is always present. This is not the case with the device herein disclosed. The fact that both members A and B are identical also results in economy in manufacture and simplicity in stocking the parts by the user of the clamp who is not called upon to keep right hand and left hand parts in separate places. It will also be noted that with the present invention there is no need of fitting the channel surfaces to the cable surfaces as has been necessary in some devices of this kind heretofore employed. Any tendency to slip produces a simple wave motion without any tendency to rotate the cable. Where the cable channel fits against the cable surface made up of spirally wound strands, as is the case in certain devices of the prior art, then any slippage of the cable tends to rotate the cable. This is objectionable and is avoided by the present construction.

I claim:

1. A clamp for securing a plurality of cables or wires together in substantially parallel relation, comprising two identical clamping members each of which consists of an apertured head and an outwardly projecting threaded stud, the stud of each member being adapted to pass through the aperture of the other member, clamping nuts threaded on the studs of the assembled members to force the bearing faces of said heads together to clamp the cable portions therebetween, said faces having substantially parallel cable channels extending lengthwise of the heads along opposite sides of the studs so that in final assembled position the studs lie between the clamped cable portions, each of said channels having a smooth wavy bottom, the opposing channels thus providing when brought together a sinuous space for the cable whereby the latter is flexed into a reverse curve when the clamp is screwed home upon it, and the edges of the heads outward of the channels being provided with interfitting projecting teeth for assisting in holding the cable against lateral shifting in the channels.

2. A clamp for securing a plurality of cables or wires together in substantially parallel relation, comprising two identical clamping members each of which consists of an apertured head and an outwardly projecting threaded stud, the stud of each member being adapted to pass through the aperture of the other member, clamping nuts threaded on the studs of the assembled members to force the bearing faces of said heads together to clamp the cable portions therebetween, said faces having substantially parallel cable channels extending lengthwise of the heads along opposite sides of the studs so that in final assembled position the studs lie between the clamped cable portions, each of said channels having a smooth wavy bottom, the opposing channels thus providing when brought together a sinuous space for the cable whereby the latter is flexed into a reverse curve when the clamp is screwed home upon it, and the edges of the heads outward of the channels being provided with projections for assisting in holding the cable against lateral shifting in the channels.

3. A clamp for securing a plurality of cables or wires together in substantially parallel relation, comprising two identical clamping members each of which consists of an apertured head and an outwardly projecting threaded stud, the stud of each member being adapted to pass through the aperture of the other member, clamping nuts threaded on the studs of the assembled members to force the bearing faces of said heads together to clamp the cable portions therebetween, said faces having cable channels extending lengthwise of the heads along opposite sides of the studs so that in final assembled position the studs lie between the clamped cable portions, said channels having smooth cable engaging surfaces providing a sinuous space for the cable when opposing channels are brought together whereby the cable is flexed into a reverse curve when the clamp is screwed home upon it, the edges of the heads outward of the channels being provided with projections for assisting in holding the cable against lateral shifting in the channels.

FRED FARRELL.